Figure 1:
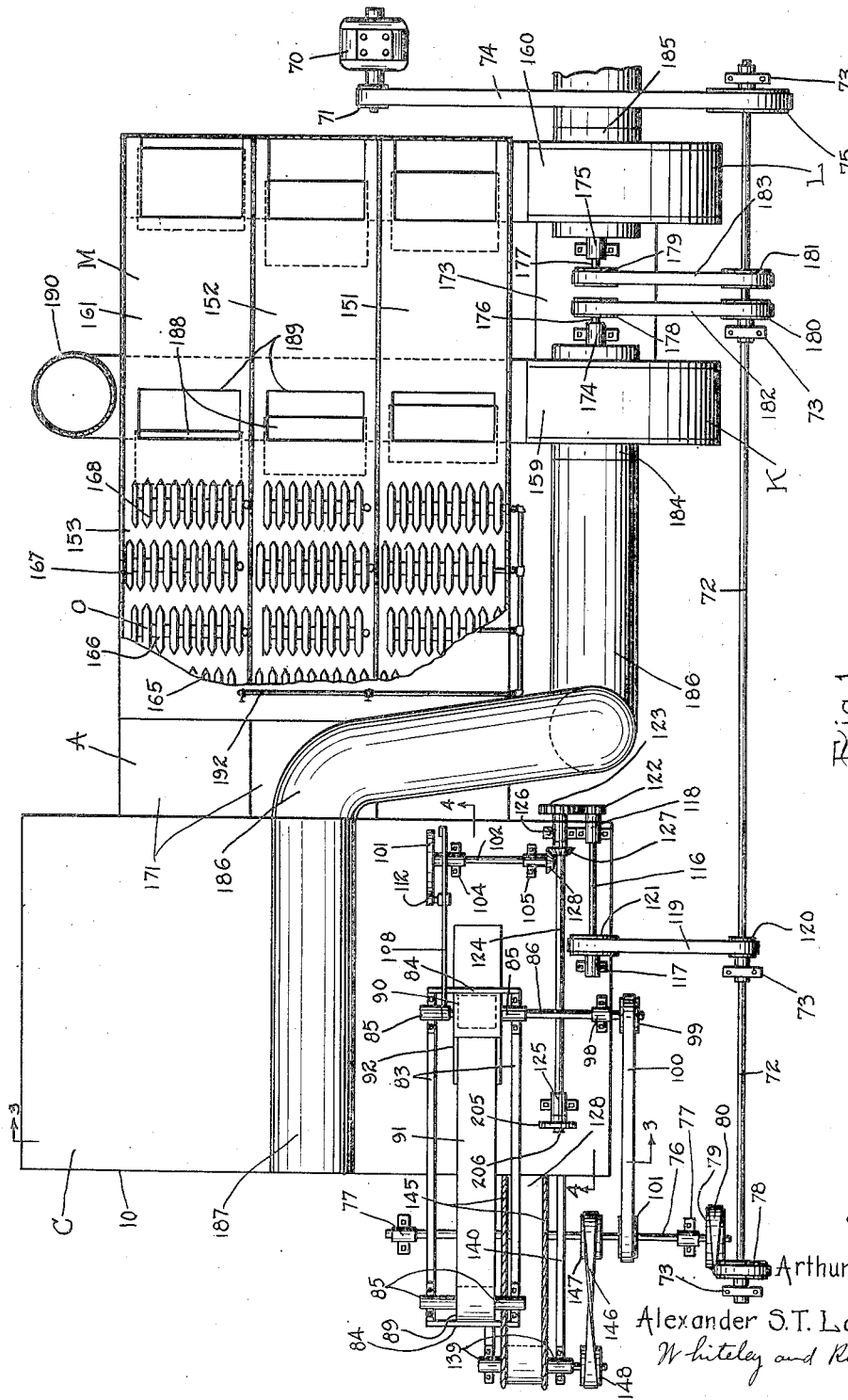

Sept. 8, 1931.  A. W. QUIGGLE ET AL  1,822,313
MACHINE FOR DRYING AND CURING MACARONI AND OTHER
PRODUCTS MADE FROM A PASTE OF FLOUR AND WATER
Filed Dec. 12, 1925  7 Sheets-Sheet 1

Inventors
Arthur W. Quiggle
Alexander S. T. Lagaard
Whiteley and Ruckman
Attorneys

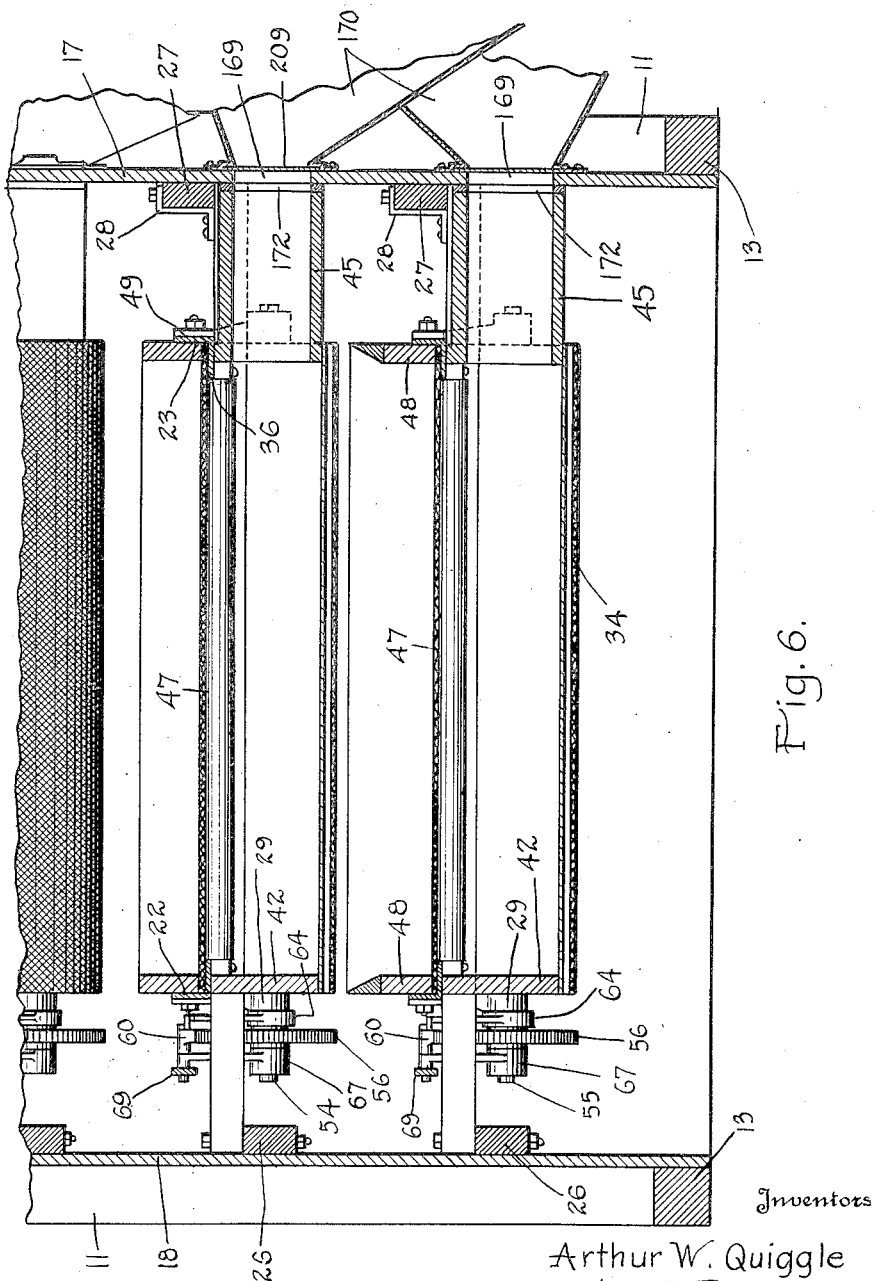

Sept. 8, 1931.    A. W. QUIGGLE ET AL    1,822,313
MACHINE FOR DRYING AND CURING MACARONI AND OTHER
PRODUCTS MADE FROM A PASTE OF FLOUR AND WATER
Filed Dec. 12, 1925    7 Sheets-Sheet 7

Inventors
Arthur W. Quiggle
Alexander S. T. Lagaard
By Whiteley and Ruckman
Attorneys Patented Sept. 8, 1931

1,822,313

UNITED STATES PATENT OFFICE

ARTHUR W. QUIGGLE AND ALEXANDER S. T. LAGAARD, OF MINNEAPOLIS, MINNESOTA, ASSIGNORS TO THE CREAMETTE COMPANY, OF MINNEAPOLIS, MINNESOTA, A CORPORATION

MACHINE FOR DRYING AND CURING MACARONI AND OTHER PRODUCTS MADE FROM A PASTE OF FLOUR AND WATER

Application filed December 12, 1925. Serial No. 75,027.

Our invention relates to machines for drying and curing macaroni and other products made from a paste of flour and water.

Such paste products are formed by machines and comprise shaped material consisting of a moist flour paste. This paste contains a large amount of water which must be removed before the product is in proper condition for packaging. In the past the practice has been to allow the moisture to be taken from the macaroni and other paste product by allowing the same to remain stored in drying rooms where it is subjected to the action of air with natural or very slightly forced draft at room temperature or at a temperature very slightly above room temperature. While so stored manual change of positioning of the macaroni or other paste product is necessary. Under this process several days, often as much as a week's time, is consumed in effecting complete drying of the paste product. This results in the consumption of a great amount of space and also requires a considerable number of operatives to effect the requisite changes in the position of the product. The old processes of room drying have heretofore been thought necessary because macaroni and other paste products are subjected to shrinkage strains in drying, which, under ordinary conditions of rapid drying have resulted in cracking and breaking the macaroni, thus reducing the commercial value of the macaroni or other paste products and sometimes rendering it practically worthless commercially. Also, it has been generally believed that the rapid drying would result in whitening and flaking the product, detracting in this manner also from its salability.

The principal object of our invention is to provide a machine or apparatus for removing the requisite amount of moisture from the product so as to produce a perfect product in a comparatively short time and with economy of floor space and manual labor. These objects are effected by means of a machine into and through which the material is fed, after the same has been mixed and formed at the presses and in which the product is successively subjected for variable periods of time to regulated currents of air.

It is an object of our invention to provide a machine which will be compact, occupying comparatively little space, so that many such machines can be used in an ordinary drying room, and to provide means forming a part of or associated with such machines for moving the formed paste products through the machine together with means subjecting said paste product successively to currents of air controlled and controllable as to the moisture content of such currents of air and as to temperature, but being of a comparatively high temperature whereby in a few hours time the paste products will be as perfectly formed, colored, dried and cured as has been done by tedious, expensive and space-consuming hand methods heretofore employed.

Our invention also is adapted to a process of curing the macaroni which includes not only the drying by means of heated air as herein defined, but also the storing of the product in suitable ventilated bins, where the same will gradually cool and the final residue of moisture which it is desired to remove will be correspondingly gradually removed from the product.

The full objects and advantages of our invention will appear in connection with the detailed description thereof and the novel features of the invention are set forth in the accompanying claims.

Figure 2:
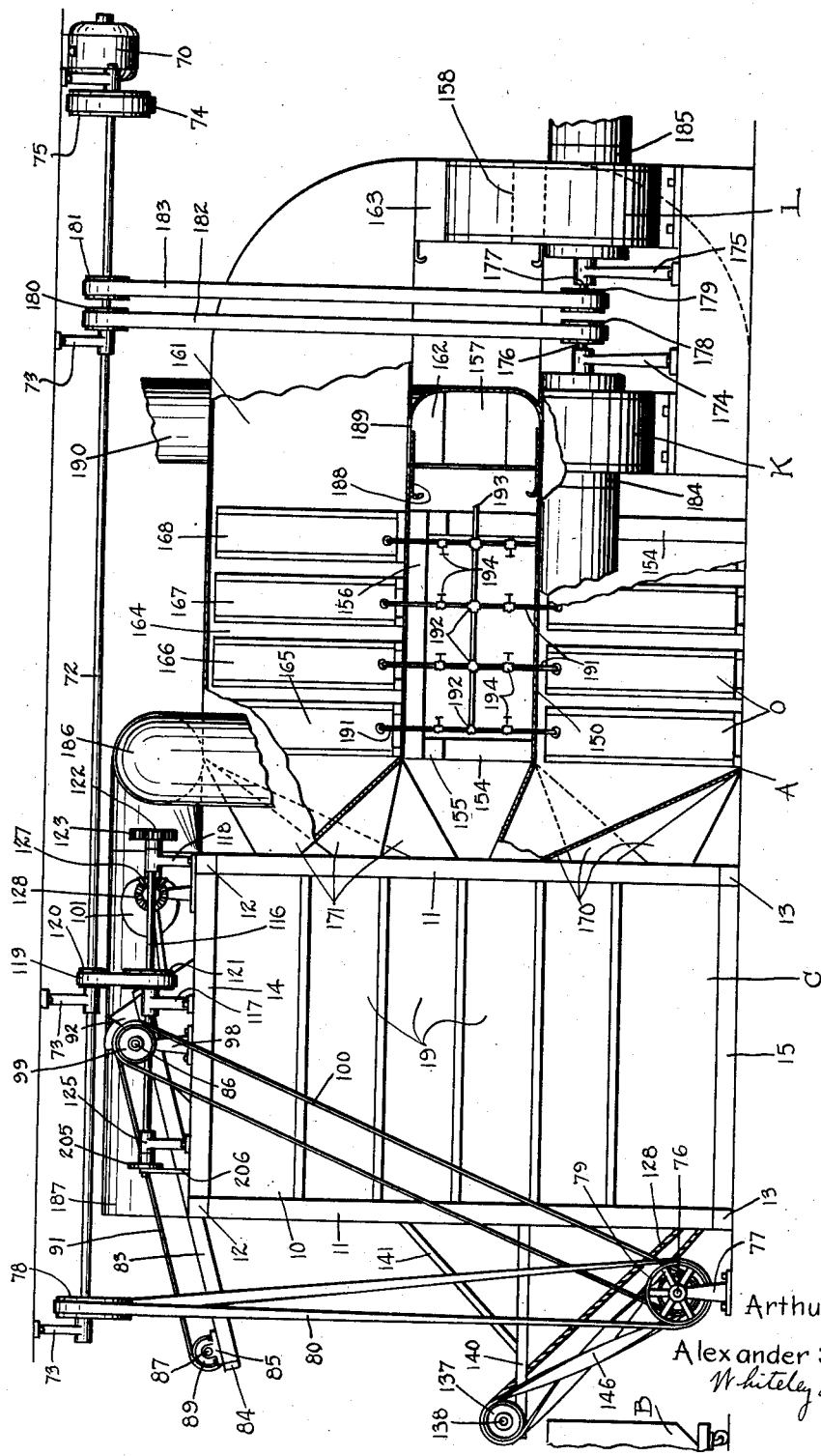
Figure 3:
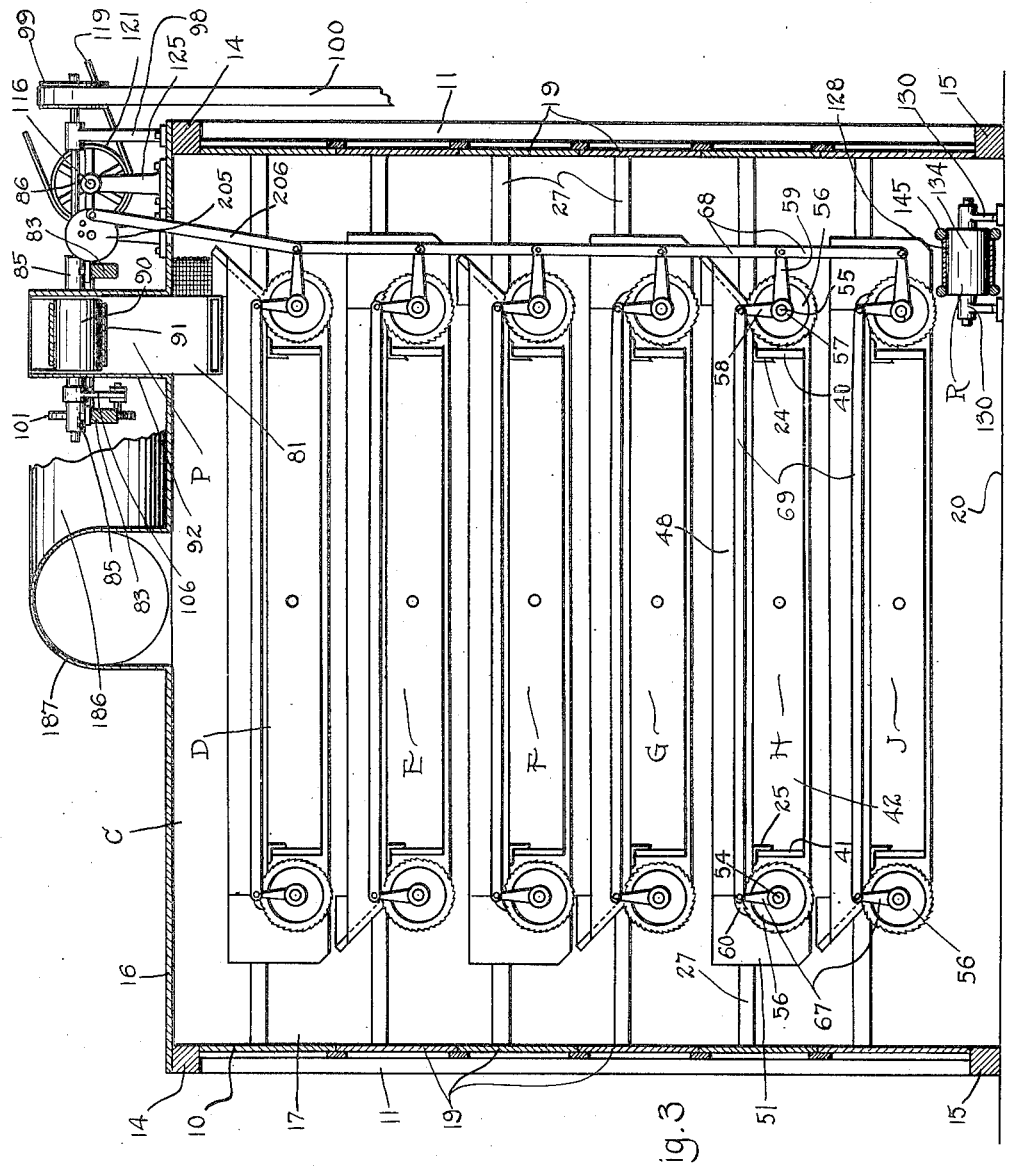
Figure 4:
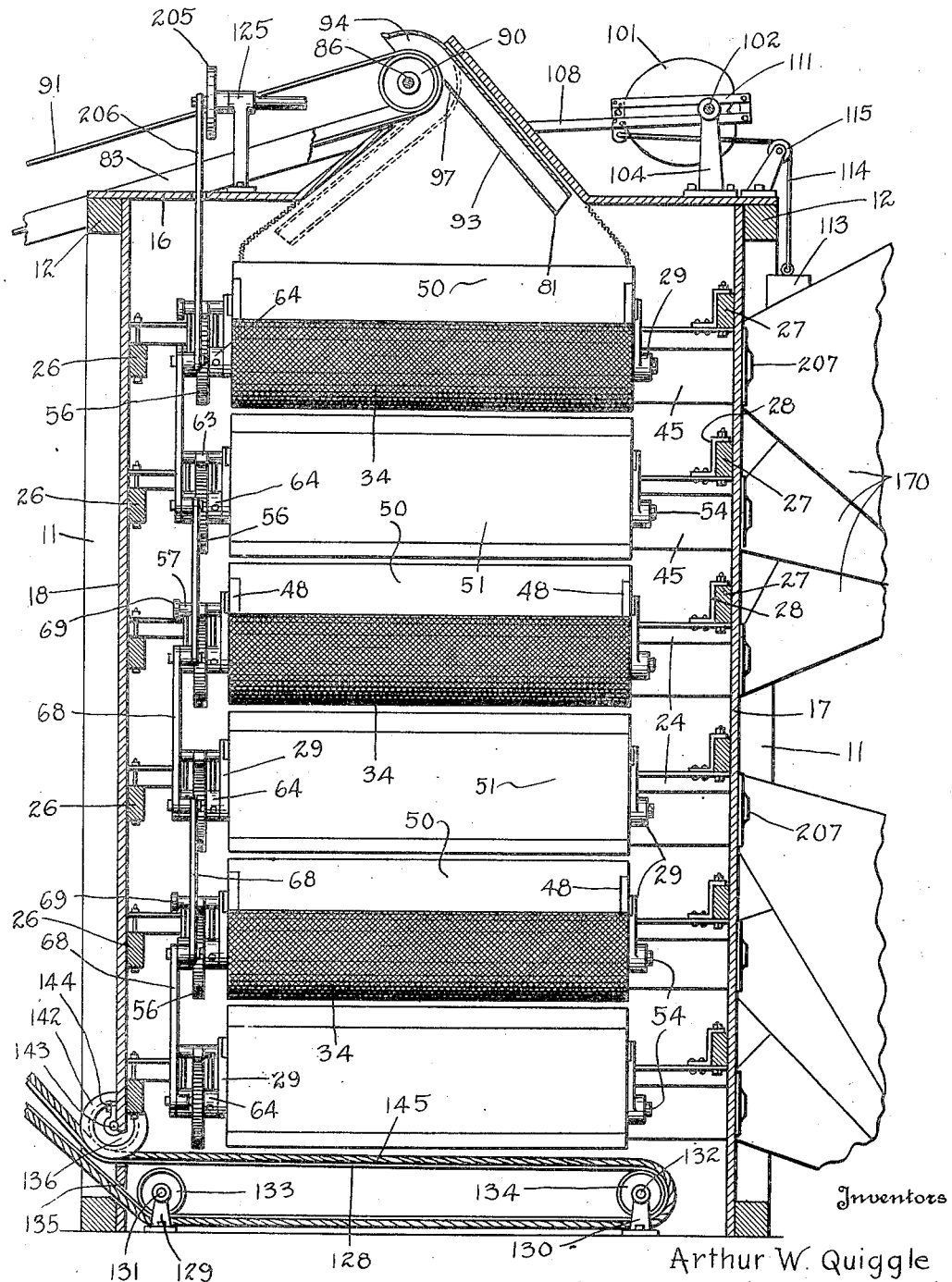
Figure 5:
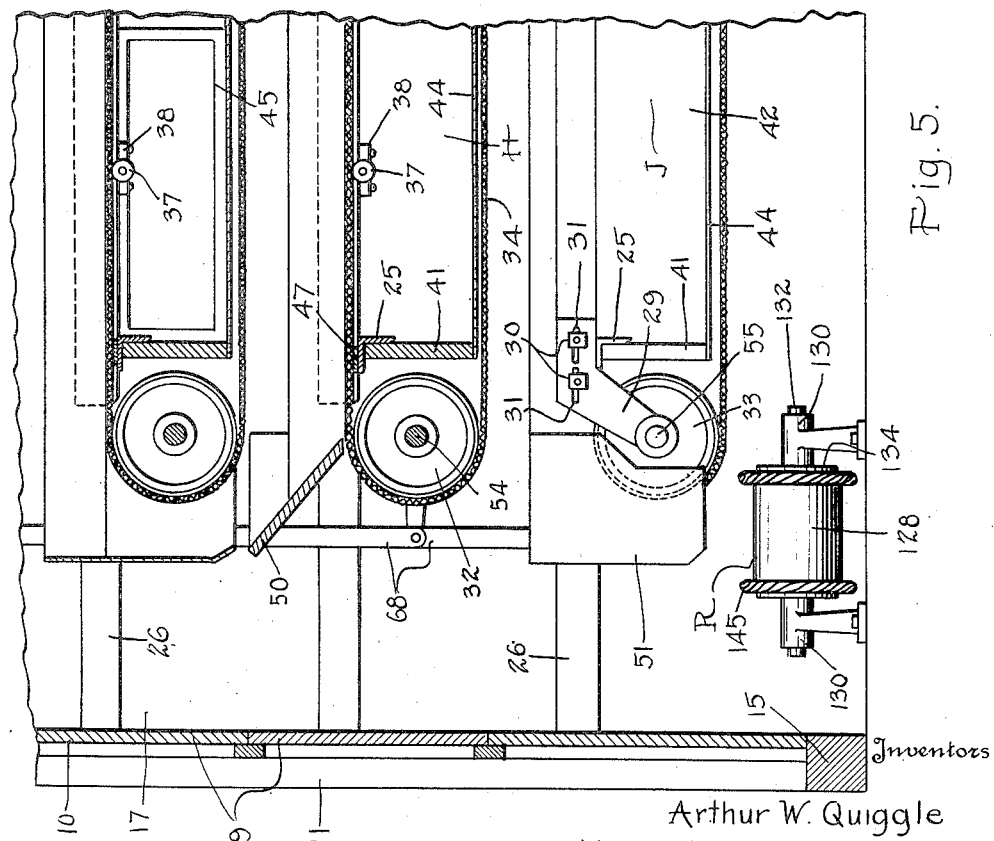
Figure 9:
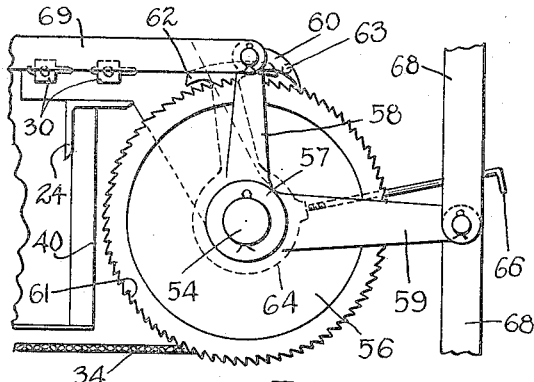
Figure 10:
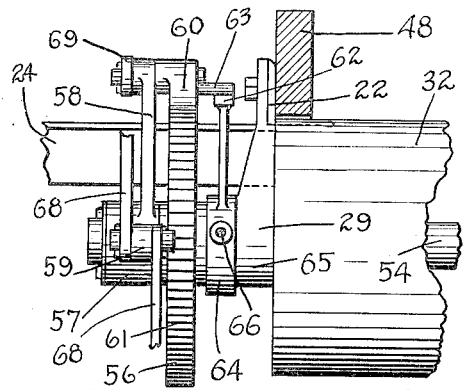
Figure 7:
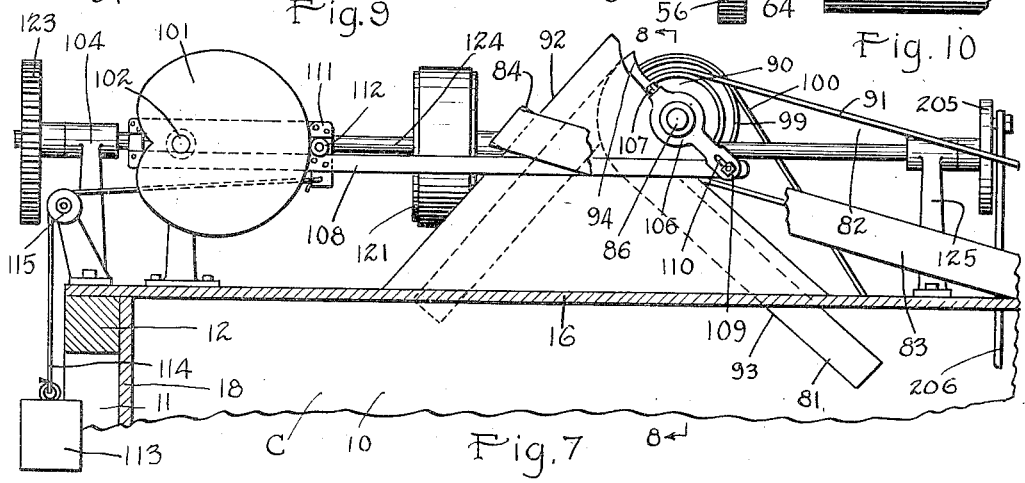
Figure 11:
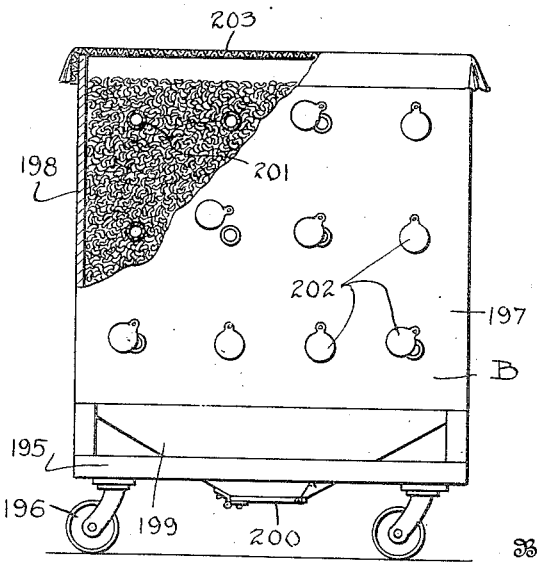
Figure 8:
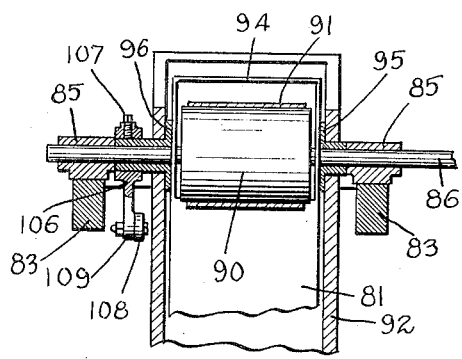

In the drawings illustrating our invention in one form:

Fig. 1 is a plan view of the drying apparatus of our invention. Fig. 2 is an elevational view of the structure shown in Fig. 1 with portions thereof cut away to more clearly illustrate features of the invention. Fig. 3 is a longitudinal sectional view of the drying machine taken on line 3—3 of Fig. 1 and drawn to an enlarged scale. Fig. 4 is a sectional view taken on line 4—4 of Fig. 1 and drawn to a still larger scale. Fig. 5 is an enlarged longitudinal sectional view of a number of the drying units illustrated in Fig. 3. Fig. 6 is a transverse sectional view of a number of the drying units. Fig. 7 is an elevational detail view illustrating the feeder mechanism for the drying machine. Fig. 8 is a sectional view taken on line 8—8 of Fig. 7. Fig. 9 is a fragmentary elevational view showing the driving mechanism for the drying units, drawn to an enlarged scale. Fig. 10 is an end elevational view of the structure shown in Fig. 9. Fig. 11 is an elevational view of one of the cooling bins with a portion of the same cut away to show the interior construction thereof.

The apparatus for carrying out our invention comprises primarily a drying system A illustrated at Fig. 1, by means of which the greater percentage of the moisture within the product is rapidly removed, and a number of cooling bins B such as shown in Fig. 11. The product passes through the apparatus A and leaves the same at a relatively high temperature with the major portions of the moisture removed, and is deposited into the bins B where the same is in compact state and is allowed to slowly cool for an extended period of time. Although the product remains in the bins B for an extended period of time, the space required for the same while in this condition is relatively small as compared with the space required where the product is completely cured in the drying rooms now used for that purpose, thereby effecting economy of space and a saving of labor in the preparing of the product for the market.

The drying apparatus consists of a drying machine C which comprises a number of drying units D, E, F, G, H and J, which are arranged one above the other and are adapted to receive the paste products and convey the same along the surface thereof and to successively discharge the product upon the succeeding drying units. By means of two blowers K and L, which form a portion of an air circulating system indicated at its entirety at M, air may be forced into the various drying units D, E, F, G, H and J and to pass through the product and to effect the drying thereof as said paste products pass along these drying units. By re-circulating a portion of the exhausted air from the drying machine, the humidity of the incoming air may be controlled and varied at will in each of the units separately.

In conjunction with the air circulating system M a number of heating units O are employed by means of which the air entering the various drying units may be separately regulated and maintained at any desired temperature within the limits of the machine. With this apparatus air of different humidity and temperature may be supplied to each of the drying units so that the effect of the drying process upon the product may be regulated to meet with the varying conditions of the product during the stages of removal of moisture from the same. The paste products are fed upon the upper drying unit D by means of a feeding mechanism P, and are discharged from the machine by means of a discharge carrier R which elevates the product and deposits it into the cooling bins B, which may be placed beneath the same and removed therefrom as said bins become filled. The construction of the apparatus which we have illustrated for the purpose of carrying out our invention will be now described in detail.

The construction of the drying machine C through which the paste products pass is best illustrated in Figs. 3 and 4. This machine is enclosed within a casing 10, constructed with a framework consisting of four posts 11 connected together with upper and lower longitudinal beams 12 and 13 and transverse beams 14 and 15. A cover 16 is rigidly attached to the beams 12 and 14, while sidewalls 17 and 18 are rigidly secured to the posts 11 and the beams 12 and 13. At the ends of this casing are provided removable closures 19 by means of which access may be had to the various drying units so that the same may be individually inspected or removed from the machine, as will subsequently become apparent. The casing 10 rests directly upon the floor 20 of the building in which the machine is installed so that the said casing forms a complete inclosure for the drying units and other mechanisms encased therein. Casing 10 may be preferably constructed of any insulating material, such as wood, or any other suitable substance, or the same may be constructed as desired and insulated by covering the exterior thereof with an insulating material so that the heat within the machine may be retained therein.

As before stated, within the casing 10 of the drying machine C are positioned the various drying units D, E, F, G, H and J which are placed one above the other, as clearly illustrated in Fig. 3. Each of these units being substantially identical in construction, the unit H, which is illustrated in Figs. 5 and 6, will be described in detail. This unit comprises a frame which consists of two longitudinal rails 22 and 23 which are connected by means of two transverse frame members 24 and 25. The rails 22 and 23 are formed of angle iron for a purpose which will presently become apparent, while the frame members 24 and 25, though illustrated as being constructed of angle iron, may be of any structural shape. The frame members 24 and 25 extend completely across the interior of the casing 10 and are supported upon runners 26 and 27 attached to the posts 11 of the machine and sidewalls 17 and 18 thereof. The runner 26 lies beneath the frame members 24 and 25, while the runner 27 is positioned above them, said frame members being carried thereon through supports 28 secured thereto, which ride upon the upper surfaces of said runners. At the intersections of the rails 22 and 23 and the frame members 24 and 25 are provided depending bearings 29 which are adjustably attached to the rails 22 and 23 by means of bolts 30 which operate in slots 31 formed in said bearings. In the corresponding pairs of these bearings are journaled shafts 54 and 55 carrying rollers 32 and 33, which are freely rotatable therein and which carry a continuous belt 34 passing completely around the same and extending across the entire width thereof. The rollers 32 and 33 are so positioned that the edges of the upper portion 35 of the belt 34 rides upon the horizontal flanges 36 of rails 22 and 23, being partly supported thereon. For further supporting this portion of the belt we employ a number of idler rollers 37 which may be journaled in bearings 38 secured to the underside of the flanges 36 of rails 22 and 23. In this manner the portion 35 of belt 34 is supported transversely at intervals between the rollers 32 and 33 and along both of the edges thereof throughout its entire length. As before stated, each of the units D, E, F, G, H and J being identical in construction and independent of one another, may be moved along the runners 26 and 27 and be independently removed from the casing 10 through openings formed by the removal of the closures 19 from said casing.

The belt 34 is constructed of spirally wound perforated metal screen adapted readily to pass along the rollers 32 and 33 without breaking or injury thereto. The paste products are discharged uniformly across the entire width of the upper portion 35 of this belt and are hence caused to move with the same as the rollers thereof are rotated by a structure to be presently described. While so moving, a blast of air is forced through the belt and the product thereon causing the same to be dried and cured as desired. The product in being deposited upon the run 35 of belt 34 causes the same to sag somewhat between the rollers 32, 33 and 37. As the belt travels, the product hence has to pass over the humps formed by the rollers 37 and in so doing is slightly agitated so that the drying of the same becomes more uniform. Such agitation is carried on to a greater degree when the product passes from one belt to the other.

For conducting the air to the belt and causing it to pass through the belt and paste products, a casing 39 is provided which is best illustrated in Figs. 5 and 6 and is constructed as follows: This casing is positioned between the upper and lower portions of the belt 34 and consists of end members 40 and 41 connected to the frame members 24 and 25, and of side members 42 and 43 connected to the longitudinal rails 22 and 23. Along the underside of these side members is attached a bottom 44 which forms an enclosure having an opening through the upper portion thereof which is covered by the portion 35 of belt 34. By means of a duct 45 leading into the sidewall 43 of casing 10 air may be conducted into the chamber 46 formed within the casing 39, and the upper portion of the belt 34. It will be noted that this portion of the belt rides directly on the flanges 36 of the rails 22 and 23 and also across the frame members 24 and 25, being slightly above the same due to the thickness of the flanges 36 of said rails. To make a substantially air-tight connection felt filler strips 47 may be employed, which can be secured to the upper flanges of the frame members 24 and 25 to make the same flush with the flanges 36 of the rails 22 and 23.

For causing the products to take their desired course along the respective drying units D, E, F, G, H and J the same are formed with guards 48, best illustrated in Fig. 6, which are bolted to the upwardly extending flanges 49 of the rails 22 and 23 and which are sufficiently elevated above the lower flanges 36 of said rails so that the upper portion 35 of belt 34 may pass freely between said guards and the flanges of said rails. When the paste product is discharged upon the belt the same lies upon the belt and between said guards, being prevented from creeping between said guards and belt by allowing the proper clearance between the same. Between the guards 48 at the receiving end of each of the conveyor units is mounted an angularly disposed feed board 50 which extends outwardly beyond the roller 32. This feed board serves to direct and feed the product as it is discharged from the drying unit immediately above the same upon the upper portion 35 of belt 34 as it leaves the roller 32. The product then passes along said belt until it reaches the other roller 33, where it is discharged over the end of the same and into an elongated funnel 51 secured to the other ends of the guards 48. The funnel 51 has sidewalls 52 and an endwall 53 which reach down to within close proximity of the feed board 50 on the drying unit immediately below it. The product as it is discharged through this funnel is hence directed upon the feed board of the unit immediately below the same, where the product is in like manner caused to travel along the belt thereof. In this manner the paste products are caused to successively travel along the various drying units in a zigzag manner, being discharged from one to the other until it reaches the lower unit where the same is removed from the machine. It will be noted that since the feed boards 50 are positioned in advance of the endwall 41 of the casing 39 and since the wall 40 of said casing is positioned inwardly from the center of roller 33, that the entire opening through said casing is completely covered by the belt 34 and is at all times completely covered by the product conveyed thereby. In this manner the air conducted into chamber 43 is caused to pass through the interstices of the paste products and to so effectively dry the same, no escape of the air excepting through the goods being possible.

For operating the rollers 32 and 33 to actuate the belt 34 and to move the goods along the opening in the casing 39 a mechanism is employed, which is shown in detail in Figs. 9 and 10. Upon the end of each of the shafts 54 and 55 adjacent the wall 18 of casing 10 is mounted a ratchet wheel 56 which is rigidly secured to it. Adjacent this ratchet wheel is mounted for swinging movement a bell crank 57 having an upstanding arm 58 and an outwardly projecting arm 59 both integrally connected together. The arm 58 has pivoted to it a pawl 60 which is adapted to engage the ratchet teeth 61 of the ratchet wheel 56 and cause the roller 32 to be rotated as the bell crank 57 is oscillated. The pawl 60 normally engages the teeth 61 of ratchet wheel 56, by gravity, and may be disengaged therefrom by means of a cam 62 adapted to coact with a lug 63 issuing outwardly from said pawl. Cam 62 is formed with a ring-like portion 64 which is journaled upon the protruding end of the hub 65 of bearing 29. A threaded rod 66 serves as a set screw for holding cam 62 in proper adjusted position relative to the lug 63 of pawl 60. As the lever 59 is oscillated in an upward direction, pawl 60 rides along the teeth 61 of the ratchet wheel 56, until the lug 63 engages cam 62 at which time said pawl is raised and continues to move out of engagement with said ratchet teeth. Upon the downward movement of lever 59, pawl 60 continues to ride upon the surface of the cam 62 until the lug 63 becomes disengaged therefrom, at which time it engages the ratchet teeth 61 and turns the ratchet wheel for the remainder of the movement of said arm 59. In this manner it becomes possible to vary the angular movement of the roller 32 for each stroke of the arm 59 and to thereby vary and control the speed of the belt 34. In the operation of the machine we find that it is more desirable to drive belt 34 through both of the rollers 32 and 33 and for this reason a similar mechanism is attached to the shaft 54 and 55, at the other end of the machine as best shown in Fig. 3. This mechanism is identical with that just described excepting that a single vertical arm 67 is employed instead of the bell crank 57, which operates in the same manner upon the ratchet wheel 56 mounted on said shafts. The arms 58 and 67 of each of the units are connected together by means of a longitudinal link 69 which causes both rollers of each unit to move simultaneously. This has the effect of producing a more positive drive for the belt so as to assure a uniform movement of the goods through the drying unit. As will be noted in Fig. 3, the shafts 54 and 55 of the units D, E, F, G, H and J positioned near wall 18 of casing 10 are provided with bell cranks 57 and that the arms thereof extend outwardly in the same direction. These arms are successively connected by links 68 which serve to similarly operate all of the rollers and cause the belt to travel. It will be noted that the pawl 60 on the units E, G, and J extend in one direction, while the pawls on the units D, F and H extend in the other direction, and that the ratchet wheels are correspondingly reversed to coact therewith. This has the effect of causing the belts 34 of these units to travel in opposite directions, thereby discharging the paste products upon opposite ends of succeeding units to cause the same to flow continuously through the machine. With this arrangement, each group of units is alternately actuated, the belts of the units D, F, and H moving on the upward stroke of the links 68 while the belts of the units E, G and J moving in the opposite direction upon the downward stroke of said links. This effects the purpose desired and at the same time minimizes the consumption of the power since only half of the belts are moved for each stroke of the operating mechanism. Due to the fact that the strokes of the operating mechanism occur quite rapidly and that the movement of the belt for each stroke is slight, it will be found that a practically continuous travel of the product through the units is effected, so that the feed and discharge of the product from one drying unit to the other is substantially uniform.

The power employed for operating the various drives and transmissions of the invention is secured from a motor 70 which may be secured to the ceiling of the building in which the apparatus is installed. This motor drives a line shaft 72 journaled in drop hammer 73 bolted to the ceiling of the building, the same as motor 70. A belt 74 passes over a pulley 71 of the motor 70 and another pulley 75 secured to one end of the shaft 72 from which power is transmitted from said motor to said line shaft. In addition to this line shaft a counter-shaft 76 is employed which is journaled in bearings 77 bolted to the floor of the building in which the apparatus is installed. Counter-shaft 76 is driven from the line shaft 72 by means of a pulley 78 secured to said line shaft and a pulley 79 secured to said counter-shaft. A quarter twist belt 80 passes around these pulleys and effects the drive of said counter-shaft. All of the various operating mechanisms of the invention are driven from line shaft 72 or counter-shaft 76 as will become apparent from the succeeding description of the invention.

The paste products are fed upon the belt 34 of the upper drying unit D by means of the feeding mechanism P previously referred to. This mechanism consists primarily of a swinging spout 81 shown in detail in Figs. 7 and 8 into which the paste products are discharged by a conveyor 82. The conveyor 82 is mounted upon a framework comprising two longitudinal frame members 83 connected together at their ends by cross members 84. Upon the ends of the frame members 83 are positioned pairs of bearings 85 in which are journaled shafts 86 and 87 carrying rollers 89 and 90. A continuous belt 91 passes over both of the rollers 89 and 90 and serves to convey the products deposited thereon along the same and to discharge said products over the end of the roller 90. Conveyor 82 is preferably arranged in an inclined manner so that the products may be easily spouted from the presses or other receiving means thereon, and so that the same may be discharged into the spout 81 at a sufficient elevation to permit said spout to function so as to uniformly discharge the products over the belt of the drying unit D. The upper ends of the frame members 83 of conveyor 82 are supported through the cross member 84 on a housing 92 which encloses the spout 81 and in which the same is adapted to swing. The spout 81 consists of a neck 93 which is connected with a hood 94 adapted to envelope the roller 90 and the upper end of the conveyor 82. This hood has attached to it two flanges 95 and 96, which are journaled on the shaft 86 and which support said spout in swinging relation relative thereto. These flanges extend up to the bearings 85 and so hold the hood 94 in proper relation to the roller 90. It will be noted that the hood 94 is uniformly spaced and concentrically arranged relative to the roller 90 and also that the upper edge 97 of the neck 93 of spout 81 follows closely along the outer periphery of belt 91 where it wraps around the pulley 90. In this manner the product upon leaving the belt 91 is discharged into the hood 94 where it falls upon either side of the neck 93 depending upon the relative angular position of the same, and is discharged into the interior of the machine. The spout 81 is caused to swing in such a manner that the goods will be discharged over the entire width of the upper portion 35 of belt 34 of drying unit D where the same will be conveyed through the machine and subjected to the drying process previously referred to. The entire feeding mechanism, as will be noted, is arranged to discharge the product upon the belt 34 in advance of the feed board 50 thereof, so that the upper portion of said belt is covered with the product throughout its length, thereby preventing the passage of air through any other channel than through the goods themselves.

The conveyor 82 is driven as follows: Shaft 86, as illustrated in Fig. 1 extends outwardly beyond the roller 90 and is journaled in an outboard bearing 98 attached to the top of casing 10. Upon the extreme end of this shaft which protrudes beyond said casing, is attached a pulley 99, which has a belt 100 wrapped around it and another pulley 101 secured to the counter-shaft 76 previously referred to. The relative diameters of these pulleys are so adjusted that shaft 86 is caused to rotate at the proper speed to feed the product into the machine with sufficient rapidity to cause the same to be discharged into the hood 94 of the swinging spout 81.

Spout 81 is swung upon the flanges 95 and 96 by means of a cam 101 and an operating mechanism actuated thereby, which is shown in detail in Figs. 1, 7 and 8. Cam 101 is secured to a cam shaft 102 which extends longitudinally of the machine C and is journaled in bearings 104 and 105 bolted to the cover 16 of casing 10. An adjustable arm 106 is secured to the flange 96 by means of a set screw 107 and extends substantially downwardly from shaft 86 in the same direction as the neck 93 of spout 81. To the lower end of this arm is adjustably pivoted a reciprocating link 108 which has a pivot 109 adapted to be secured to said arm 106 in any position along the same within a slot 110 formed therein. The other end of arm 108 is formed bifurcated as indicated at 111, and straddles the shaft 102 adjacent cam 101 forming a guideway along which said shaft may move relative to said link. This portion of link 108 is held in proper longitudinal relation upon shaft 102 by means of the bearing 104, which is positioned adjacent the same. Along the link 108 in proximity to the periphery of the cam 101 is placed a roller 112 which is adapted to engage the cam surface of said cam and to cause the link 108 to be reciprocated as the shaft 102 operates. This roller is held in contact with the cam surface of cam 101 by means of a weight 113, which is attached to a cord 114 secured to link 108 and which passes over a pulley 115 mounted on frame member 12. As the cam 101 rotates, link 108 throughout a portion of the rotation thereof is caused to travel away from shaft 102 and to swing the spout 81 towards the extreme portion thereof shown in full lines in Fig. 7. As the cam continues to rotate, roller 112 follows the surface thereof by means of the weight 113 and swings spout 81 back again to its opposite position shown in dotted lines in Fig. 7, thereby causing the spout to swing to and fro from one position to the other. By properly designing the operating surface of the cam, it can be readily seen that the disposition of the paste product by neck 93 of spout 81 can be regulated, so that a uniform layer of the product can be deposited upon the belt of the drier unit D as the product is fed into the machine.

Feeder P is driven as follows: Upon the top 16 of casing 10 is located a shaft 116 which is journaled in bearings 117 and 118 secured thereto. A belt 119 passes over a pulley 120 attached to the line shaft 72 and a second pulley 121 secured to the shaft 116. On the end of the shaft 116 is secured a pinion 122 which meshes with a spur gear 123 fast on a second counter-shaft 124. This shaft is journaled in bearings 125 and 126 similar to the bearings 117 and 118, which are also attached to the top 16 of casing 10. Upon the shaft 124 is attached a bevel gear 127 which meshes with another bevel gear 128 secured to the end of shaft 102. As the line shaft 72 rotates, shaft 116 is driven through the pulleys 120 and 121 and the belt 119, which in turn drives the shaft 124 through spur gears 122 and 123 and the shaft 102 through the bevel gears 127 and 128. With this arrangement, a considerable reduction in the speed of shaft 102 may be secured so that the spout 81 may swing slowly and uniformly to discharge the product across the belt 34 of the drying unit D, thereby depositing the product in a uniform layer upon the same as said belt is moved by the actuating mechanism therefor.

The mechanism for oscillating the bell cranks 57 to cause the belts 34 to travel, is operated as follows: Upon the end of the shaft 124 which is driven from shaft 116 through gears 122 and 123, is rigidly attached a flange plate 205. A connecting rod 206 is eccentrically pivoted to this plate in adjustable relation thereto at its upper end and at its lower end is pivoted to the arm 59 of bell crank 57 of the drying unit D. As shaft 124 rotates connecting rod 206 and the links 68 successively pivoted thereto are alternately caused to raise and lower thereby oscillating the arms 57 and moving the belts 34.

As previously brought out, the product is fed into the machine by the feeder P, where it is deposited upon the upper drying unit D traveling successively in zigzag relation through the succeeding units until it reaches the lower unit J, where the same is discharged over the end of the roller 33 thereof and into the funnel 51 of said unit. To collect the product as discharged from this funnel, the discharge carrier R is employed which is best illustrated in Figs. 1, 2, 3 and 4. This conveyor consists of an inclined continuous belt 128, which is supported and constructed as follows: Within the interior of the casing 10 immediately below the lower drying unit J are bolted bearings 129 and 130 in which are journaled shafts 131 and 132 carrying rollers 133 and 134. Belt 128 passes around these rollers and outwardly through openings 135 and 136 in the wall 18 of casing 10. At the upper end of this belt the same is supported on another roller 137 which is mounted on a shaft 138 journaled in bearings 139. These bearings are carried by cantilever beams 140 secured to casing 10, which are supported and held in proper position by means of braces 141 secured thereto and to said frame. The lower run of the belt 128 passes beneath the roller 133 and is caused to incline upwardly by means thereof. The upper run of said belt, however, is inclined upwardly by means of two sheaves 142 which are mounted on a shaft 143 journaled in bearings 144. These bearings are attached to the wall 18 of casing 10 immediately above the opening 136 therein, so that the opening 136 remains open immediately above belt 128. The sheaves 142 are engaged by two ropes or cables 145 secured to the edge of belt 128. These cables cause the belt to bend, as indicated, and also serve to hold the paste product in place upon said belt. By means of this construction, the product which is discharged through the funnel 51 is deposited upon the upper run of belt 128 between the ropes 145 secured thereto and passes upwardly between sheaves 142 and shaft 143 to the upper end of said belt, where the same is discharged over the end of roller 137 and into any suitable receptacle placed beneath the same.

The discharge carrier R is driven by means of a crossed belt 146 which passes over a pulley 147 secured to counter-shaft 76 and over another pulley 148 secured to the extreme end of shaft 138 which carries the roller 137. This causes the belt 128 to travel in the opposite direction from the belt of the feeder P and to discharge the product from the machine, as required.

In effecting the drying of the product as the same passes along the various drying units, heated air of a proper temperature and humidity is forced into each of the chambers 46 of said drying units. This is accomplished as follows: Upon the exterior of the drying machine C is arranged three longitudinally disposed casings 150 which rest directly upon the floor of the building. Immediately above these casings are arranged three similar casings 151, 152 and 153, which are supported upon posts 154 carried by supporting cross timbers 155 and 156. These upper casings are spaced from the lower casing a sufficient distance to permit of installing between the said casings a humid air trunk 157 and a fresh air trunk 158, the purposes of which will presently be explained. These trunks are directly connected to the exhaust outlets 159 and 160 of the blowers K and L, previously referred to. The two sets of casings are arranged at their extreme ends to form mixing chambers 161, which communicate with the trunks 157 and 158 by means of ducts 162 and 163. Between these mixing chambers and the machine C within said casings are provided heating chambers 164 in which are positioned a number of heating coils 165, 166, 167 and 168, which are connected together as will be presently described in detail.

Each of the casings 39, as previously stated, is provided with a duct 45 which is connected to the wall 43 thereof and extends outwardly beyond the same where it engages the inner surface of the wall 17 of casing 10. At the proper position in wall 17 are formed openings 169 which register with the said ducts 45. These openings are connected with the heating chambers 164 of the air circulating system by means of ducts 170 and 171 which converge from said casing to said opening. To make an air tight joint, a felt or rubber gasket 172 may be employed, which is attached to the edges of the ducts 45. In this manner the heated air passing through the chambers 161 and 164 of the air circulating system is forced into the chambers 46 of the various drying units and caused to pass up through the product so as to dry and cure the product as the same travels along said drying units.

The blowers K and L which circulate the air through the system are mounted on a base 173 and are provided with bearings 174 and 175 which support the rotor shafts 176 and 177 thereof. These shafts carry pulleys 178 and 179 which are belted to pulleys 180 and 181 secured to line shaft 72 through the agency of belts 182 and 183. The inlets 184 and 185 of blowers K and L fall in opposite directions, inlet 185 leading directly into the room or to any source of fresh air. The inlet 184 of blower K is connected by means of ducts 186 to a trunk 187 extending across the upper portion of the casing 10 of drying machine C and communicating throughout its length with the interior thereof. When blower K functions, the same serves to withdraw the humidified air leaving the product from the casing 10, and to discharge it into the trunk 157. In a similar manner blower L draws the fresh air from the room, or a suitable source of supply and discharges it into the trunk 158. Both of these trunks 157 and 158 communicate with each of the mixing chambers 161 through the ducts 162 and 163 as previously stated. A flow of air through these ducts is individually regulated by means of valves 188 which control the openings 189 from said ducts and into said chambers. In this manner the humidity of the air entering the heating chambers 164 may be varied to suit the requirements by injecting a portion of the humid air drawn from the drying machine into said chamber 161 and mixing it with the fresh air delivered into said chamber by the blower L. The trunk 158 is dead-ended, causing all of the air delivered by blower L to be discharged into the mixing chambers 161. The end of the trunk 157 is, however, connected with an exhaust pipe 190 which conducts the unused portion of the exhaust air to the atmosphere, or to any suitable retempering apparatus where the moisture may be extracted from the air to enable the same to be again utilized for drying purposes. With this arrangement it can readily be seen that the humidity of the air entering each of the drying units D, E, F, G, H and J may be independently varied to suit the requirements. At the same time the volume of air entering these individual drying units may be regulated by closing the valves 188 connected with the ducts 163 from blower L.

The heat coils 165, 166, 167 and 168 may be of any desired construction by means of which the heat may be efficiently transferred to the air passing through the same and are supported upon the floor of the building and the beams 156 carrying the upper casing of the air circulating system. These coils of the heating units O are each connected by its own separate feed pipe 191 to a number of steam pipes 192 which in turn are all connected to a steam heater 193. Each of the feed pipes 191 is provided with a valve 194 by means of which the amount of steam entering each respective coil can be independently varied at will. By properly regulating these valves, the temperature of the air entering the respective drying units can be independently controlled so that different degrees of temperature may be had in each of said drying units. At the same time, as previously brought out, the air in these drying rooms may have any desired relative humidity within the limits of the machine so that air may be delivered to the product at any temperature, in any volume, and with any degree of humidity desired within the range of the apparatus.

It is to be noted that with the drying machine of our invention absolute control of the product and the drying of the same as it passes through the apparatus may be had. The speed of the product as it passes over the various drying units may be independently regulated so that the product may travel rapidly over some of the units and less rapidly over others, the result being, of course, that the product lies in a bed of greater depth where the movement is slow than where the movement is rapid. The volume of heated air entering each unit can be independently regulated so that the degree of drying can be varied to suit the requirements. At the same time the humidity and temperature of the air used for the drying of the product can be independently regulated and varied so that perfect control of the functioning and operation of the machine is secured.

In the curing or drying of the alimentary paste products considerable difficulty is encountered, due to the fact that uneven expansion and contraction of the walls of the product while the removal of moisture takes place frequently causes checking, cracking, and flaking of the same so as to render the product unsuitable for commercial use. By altering the relative humidity of the drying air in some of the drying units, such action can be prevented without greatly affecting the time required to produce the required result.

As the product leaves the drying machine C, the same is deposited in suitable bins B such as illustrated in Fig. 11. These bins consist of a framework 195 carried by castor wheels 196 which supports a hopper 197 having walls 198, and a hopper bottom 199 closed by a suitable valve 200. Across the walls 198 are mounted a plurality of perforated tubes 201 which lead to the exterior of the bin and whose ends may be closed by means of shutters 202 pivoted to said walls and adapted to swing to cover or uncover the open ends of said tubes. The top of the bin B is preferably left open to receive the product as the same is discharged from the discharge conveyor R. As can readily be understood, a suitable number of such bins may be employed as will be required to handle the output of the machine. The product upon being discharged into the bin is allowed to fill the same and a suitable cover 203 is placed over it which may consist of a number of layers of cotton duck or other suitable material forming a heat insulator and at the same time permitting the air, which circulates through the goods, to escape therefrom. The walls 198 are also formed of heat insulating material. After the bin B has been filled and the closure 203 placed thereon, said bin is transferred to a suitable storage space where the product is allowed to gradually cool. To effect the uniform cooling of the same, the shutters 202 are sufficiently open to permit of natural circulation of air through tubes 201 and into the body of the product where the same slowly passes up through the interstices therein and escapes through the closure 203. This closure, if desired, can be formed of any insulating material properly perforated to allow the cooling air to escape. Although a slight amount of reduction in the moisture content of the product occurs during this step in the process in the curing of the same, the product remains in these bins principally for the purpose of cooling it and allowing the strains and stresses in the same to adjust themselves, so that when the process is completed it leaves the product in a stable condition suitable for the market.

The advantages of our invention are manifest. Considerable time can be saved in the curing of the alimentary paste products as well as space required in the drying rooms while the product is undergoing the drying or curing process. The manual handling of the product during the drying process is completely eliminated with our invention, thereby reducing the expense of manufacture and at the same time making the manufacture of the same more sanitary. Absolute control of the drying process may be had with our invention throughout each individual step thereof so that a product of uniform structure and appearance will result.

Having described our invention in the form which we consider to represent the best embodiment thereof, we desire to have it understood that the invention may be constructed in different ways and put to uses other than those disclosed within the scope of the following claims.

We claim:

1. A machine for drying macaroni and other alimentary paste products comprising a multiplicity of drying chambers, each having an opening, means for feeding macaroni across said openings successively, means for forcing air independently into each of said chambers and through said openings and macaroni, and means for independently heating the air forced into each chamber and for independently regulating the temperature of the air forced into each chamber.

2. A machine for drying macaroni and other alimentary paste products comprising a multiplicity of drying chambers, each having an opening, means for feeding macaroni across said openings successively, means for forcing air independently into each of said chambers and through said openings and macaroni, and means for independently adding moisture to the air forced into each of said chambers.

3. A machine for drying macaroni and other alimentary paste products comprising a multiplicity of drying chambers, each having an opening, means for feeding macaroni across said openings successively, means for forcing air independently into each of said chambers and through said openings and macaroni, means for independently adding moisture to the air being forced through each chamber, and means for independently regulating the amount of moisture in the air being forced through each chamber.

4. A machine for drying macaroni and other alimentary paste products comprising a multiplicity of drying chambers, each having an opening, means for feeding macaroni across said openings successively, means for forcing air independently into each of said chambers and through said openings and macaroni, means for accumulating the air forced through all of said chambers, and means for mixing said accumulated air independently and selectively with the air supplied to each of said chambers.

5. A machine for drying macaroni and other alimentary paste products comprising a multiplicity of drying chambers, each having an opening, means for feeding macaroni across said openings successively, means for forcing air independently into each of said chambers and through said openings and macaroni, means for accumulating the air forced through all of said chambers, means for mixing said accumulated air independently and selectively with the air supplied to each of said chambers, and means for regulating the amount of accumulated air to be independently mixed with the air supply going to any of said chambers.

6. A drying machine comprising a plurality of drying units, a fresh air trunk, an exhaust air trunk and a plurality of casings forming mixing chambers adapted to be connected with both of said trunks and with said drying units.

7. A drying machine comprising a plurality of drying units, a fresh air trunk, an exhaust air trunk and a plurality of casings forming mixing chambers adapted to be connected with both of said trunks and with said drying units, and means for individually varying the amount of air from either of said trunks entering any of said mixing chambers.

8. A machine for drying macaroni and other alimentary paste products comprising a multiplicity of drying chambers each having an opening, means for feeding macaroni across said openings successively, means for forcing air independently into each of said chambers and through said openings and macaroni, and means for controlling the heat of such several currents of air so that the temperature of the air shall vary in successive chambers.

9. A machine for drying macaroni and other alimentary paste products comprising a multiplicity of drying chambers each having an opening, means for feeding macaroni across said openings successively, means for forcing air independently into each of said chambers and through said openings and macaroni, and means for independently controlling the moisture in each current of air so that the moisture content will vary for each current of air.

In testimony whereof we hereunto affix our signatures.

ARTHUR W. QUIGGLE.
ALEXANDER S. T. LAGAARD.